(12) United States Patent
Yehuda et al.

(10) Patent No.: US 8,499,331 B1
(45) Date of Patent: Jul. 30, 2013

(54) POLICY BASED NETWORK COMPLIANCE

(75) Inventors: Hanna Yehuda, Newton, MA (US);
Daniel C. Lanzi, Wilton, CT (US);
Oran Epelbaum, Tel Aviv (IL); Frank Murphy, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1547 days.

(21) Appl. No.: 11/769,407

(22) Filed: Jun. 27, 2007

(51) Int. Cl.
*H04L 29/06* (2006.01)

(52) U.S. Cl.
USPC ............... 726/1; 709/223; 709/224; 709/225; 709/226; 709/229

(58) Field of Classification Search
USPC ............................................................ 726/1
See application file for complete search history.

(56) References Cited

U.S. PATENT DOCUMENTS

| | | | | |
|---|---|---|---|---|
| 7,552,480 B1* | 6/2009 | Voss | ................. | 726/25 |
| 2002/0016840 A1* | 2/2002 | Herzog et al. | ................ | 709/225 |
| 2002/0053033 A1* | 5/2002 | Cooper et al. | ................ | 713/201 |
| 2002/0194317 A1* | 12/2002 | Kanada et al. | ................ | 709/223 |
| 2003/0153991 A1* | 8/2003 | Visser et al. | .................... | 700/79 |
| 2003/0233567 A1* | 12/2003 | Lynn et al. | .................... | 713/200 |
| 2004/0111643 A1* | 6/2004 | Farmer | .......................... | 713/201 |
| 2004/0205089 A1* | 10/2004 | Alon et al. | .................... | 707/200 |
| 2004/0215733 A1* | 10/2004 | Gondhalekar et al. | ........ | 709/207 |
| 2004/0221249 A1* | 11/2004 | Lahner et al. | ...................... | 716/4 |
| 2005/0015622 A1* | 1/2005 | Williams et al. | .............. | 713/201 |
| 2005/0157662 A1* | 7/2005 | Bingham et al. | .............. | 370/254 |
| 2005/0278775 A1* | 12/2005 | Ross | ................................. | 726/2 |
| 2006/0281016 A1* | 12/2006 | O'Brien | ............................ | 430/5 |
| 2007/0030803 A1* | 2/2007 | Gooch et al. | .................. | 370/230 |
| 2007/0180119 A1* | 8/2007 | Khivesara et al. | ............ | 709/226 |

OTHER PUBLICATIONS

Rao, A.M.M., Policy Specification and Enforcement for Detection of Security Violations in a Mail Service, Dec. 2006, 9th International Conference on Information Technology ICIT '06, pp. 172-175.*

* cited by examiner

*Primary Examiner* — Taghi Arani
*Assistant Examiner* — Kenneth Chang
(74) *Attorney, Agent, or Firm* — Krishnendu Gupta; Gerald P. Kazanjian

(57) ABSTRACT

A network compliance application performs a method of coalescing violation data based on rule and policy violations by retrieving network event data indicative of compliance with a set of policies, in which each of the policies has a set of rules. Policy definition includes a template of rules, definition of rule severity, and a compliance threshold specifying a number of rules of a severity that render the policy non-compliant. The compliance application computes, for each of the policies, violations, each violation indicative of a deviation from a particular rule, and displays a series of views indicative of a plurality of policies in the set of policies, each of the views indicative of violations attributable to each of the policies. From the displayed view, the application receives a detail selection corresponding to a subset of the displayed violations for detailed report display.

18 Claims, 13 Drawing Sheets

POLICY BASED NETWORK COMPLIANCE

BACKGROUND

In a configured information network, such as a managed information network, a network fabric, or infrastructure, interconnects network elements, or nodes, for providing various services to end users that are also connected to the network. In a managed information network, for example, a number of storage arrays are adapted to provide data storage and retrieval services. The storage arrays connect to other elements such as switches and hosts to efficiently provide the services to the users. Further, each storage array includes a set of individual storage devices (e.g. disk drives) that are themselves considered network elements. The collection of elements defines a configuration of the information network that is often updated to respond to changes in the network, such as for performance improvements, message traffic redirection, and equipment failures.

In a typical information network, the number of interconnected elements can become large, resulting in a substantial number of relationships between the network elements (nodes), the network connections between them, and the application that execute on them. Accordingly, a set of rules may be implemented to identify good or mandatory practices in the network, such as providing a redundant link between critical nodes, or always deploying application A on a node with application B, for example. This set of rules defines a policy that network administrators enforce to maintain the network in a predictable and manageable state. However, identifying and verifying each of the rules across the network may become cumbersome in a large network. Further, the policy including the rules may be driven by external factors, such as corporate directives, security requirements, industry best practices, and Federal compliance laws. Therefore, at any particular site or enterprise, there may be multiple policies to be satisfied, each having a multiplicity of rules in effect.

SUMMARY

In a managed information network, multiple policies proscribing or requiring network practices may be imposed. These policies specify requirements for connections between nodes (hosts), application dependencies for services provided by the nodes, and configurations of individual nodes. Each policy includes a plurality of rules that identifies network elements, or objects (hosts, services, or connections), a scope of the rule identifying which network objects it applies to, and a desired state to test for satisfaction of the rule. The desired state indicates a condition specifying the state complying with the rule. A passive probe mechanism populates a configuration management database (CMDB) with data concerning network health. A near real time gathering daemon maintains the CMDB in a current state. A policy manager identifies policies in force and the rules included in each, and a violation processor evaluates each rule against the network health data in the CMDB. A display engine receives report requests (queries) from a user, and displays results in a dashboard view that indicates compliance with each policy and with individual rules in each policy. The view presents a graphical user interface (GUI) that provides an overview of policy compliance, and allows dill-down queries to interrogate specific rule violations and severity within particular policies. The GUI depicting the dashboard view output reports are discussed further in copending U.S. patent application Ser. No. [11/769,561], filed Jun. 27, 2007, entitled "NETWORK POLICY ENFORCEMENT DASHBOARD VIEWS", incorporated herein by reference.

Conventional network policy enforcement suffers from the shortcoming that policies are defined in a "black and white" approach that defines policy failure in an overly rigid, non-flexible manner which may cause a minor or non-fatal occurrence to trigger failure of the entire policy. Accordingly, configurations herein substantially overcome the rigid, ungranular nature of conventional policy management by providing a modifiable policy definition mechanism and interface having adaptable scope and rule applicability. Each policy has an independent scope of the network resources it covers, and includes a specified set of rules. Each of the rules likewise has an adjustable scope and severity, such that the relative weight or impact of a particular rule on the overall policy may be appropriately determined. A number of policies may be in force, and for each policy a threshold, or tolerance, of allowable non-compliance instances (i.e. failed rules) is determined. Accordingly, a user or operator fine-tunes the policies to cover a specified group or subnetwork, and within each policy permits a specified number of permitted deviations before triggering non-compliance of the entire policy.

Therefore, each of the policies has a flexible scope, modifiable by authorized users as determined by a permission scheme. The scope defines the network resources (typically hosts) that the policy is applied to, and for each policy, the included set of rules applied and the severity of each rule violation (non-compliance) assessed against the threshold of tolerated non-compliances for that severity. For example, a policy might allow only one or two failures of a rule having high severity of non-compliance, but might allow 5 or 10 rule violations of a lesser, more minor non-compliance. Further details on specific rule definition are disclosed in copending U.S. patent application Ser. No. [11/769,499], filed Jun. 27, 2007, entitled "RULE BASED NETWORK RESOURCE COMPLIANCE", incorporated herein by reference.

In further detail, the method of policy-based testing of network resource compliance as disclosed herein includes defining and maintaining a set of policies, such that each policy in the set contains i) a set of rules and corresponding violation criteria for rules within the set of rules, ii) a policy scope that indicates what resources from a network environment the rules in the policy are to be applied, and iii) a policy compliance statement that defines a set of rule violations of varying severity that determine overall policy violation. Policies are defined and maintained via any suitable interface such as the graphical user interface (GUI) discussed below, and the defined polices employed by a compliance manager to gather compliance data from observed network activity, in which the compliance data is indicative of network resources. The violation processor in the compliance manager applies the set of policies and associated sets of rules to the gathered compliance data to calculate compliance results indicating compliance of those network resources represented by the compliance data, and a GUI display engine reports or outputs the compliance results of resources represented in the network resource data.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java™ Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a screen display of selection of a policy from a template in the policy definition of FIG. 2;

FIG. 10 is a screen display of selection of policy compliance thresholds in the definition of FIG. 6;

FIG. 11 is a screen display of selection of compliance notifications in the definition of FIG. 6;

FIG. 13 is a screen display of policy review in the definition of FIG. 6.

DETAILED DESCRIPTION

Figure 1:
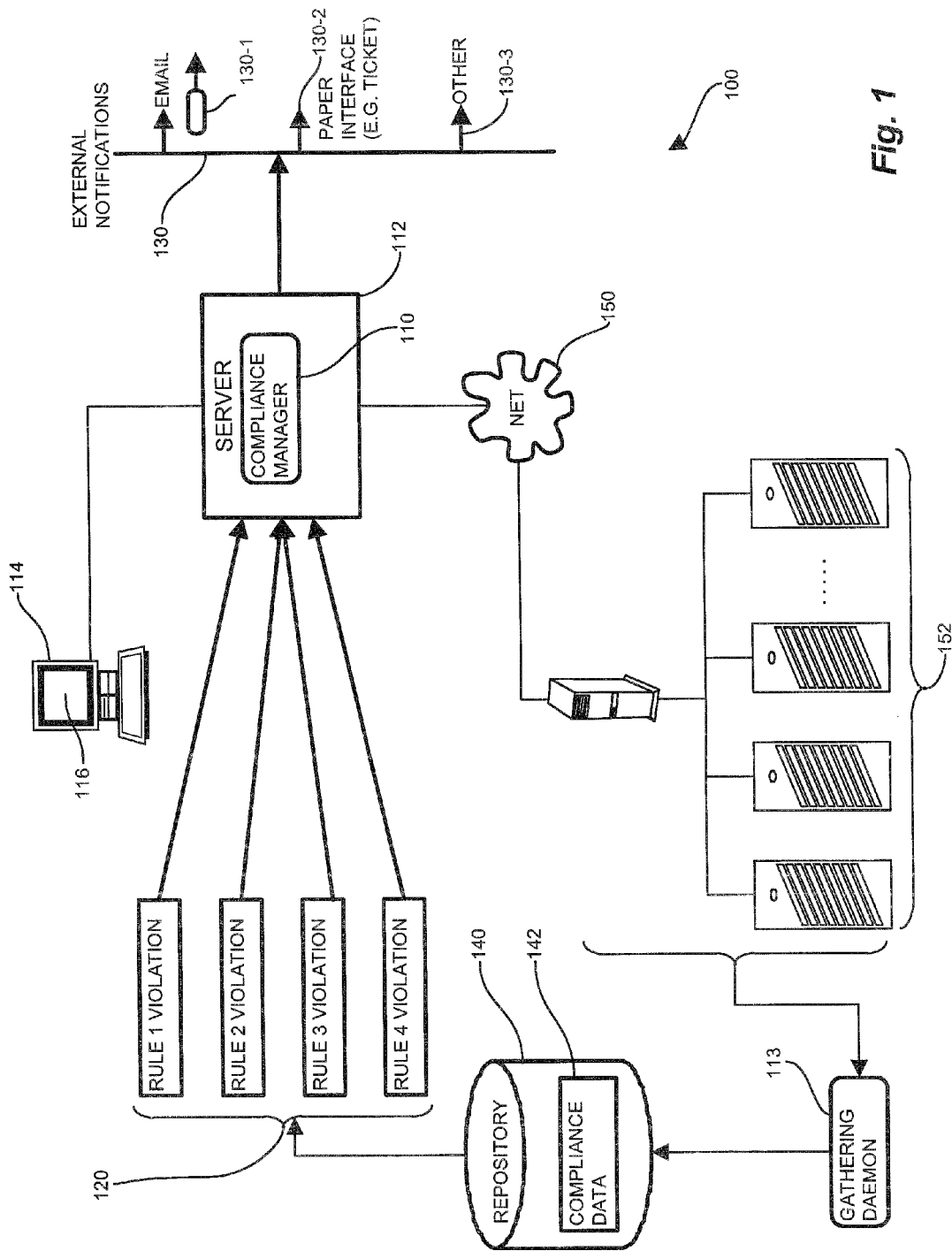
FIG. 1 is a context diagram of a managed information network environment suitable for use with the present invention.

In a managed information network, a compliance manager provides rule violation reports that provide an overview of all policies active in a network, and allows a user to drill down to receive specific rule violation reports on pinpointed trouble areas. In the example arrangement, the managed information network may be a storage area network operable to interconnect storage arrays for data storage, retrieval, and recovery services provided to a user community, however the disclosed system is applicable to any suitable managed information network. The rules take the form of policies, or collections of rules, that collectively define the criteria of a compliant network. Each policy, therefore, includes a set of rules.

In a large network, therefore, each policy may trigger a potentially enormous number of rule violations. Identification of particular rule violations isolates specific details about areas of concern. Report views of rule violations are discussed further in copending U.S. patent application Ser. No. [11/769,561], filed Jun. 27, 2007, entitled "NETWORK POLICY ENFORCEMENT DASHBOARD VIEWS". Definition of rules is discussed further in the copending U.S. Patent Application cited above, both incorporated herein by reference. For example, in a corporate practices policy, a particular rule may check that web servers in human resources and finance running Redhat™ Linux 3 have update 6. Another rule may specify a check that Oracle® servers in NY and San Jose have shared pool size set to no more than 350 GB.

Such rules are generally in the form of [object] [scope] and [desired state], or condition for compliance, where the object defines the network object the rule applies to, and scope refines the object set. The objects typically specify hosts (nodes), services (applications) and connections. The condition for compliance then defines the desired state to determine compliance with the rule. Failure to satisfy the desired state constitutes noncompliance with the rule, and a predetermined number of failed rules indicates failure of the policy to which they belong. The rules of a policy are generally selected along a particular theme, such as security, standards compliance, or efficiency. Rules may often be predicated on connections between nodes or applications. A retail organization that uses credit cards may have a policy that there should be no connectivity between payroll server and credit card server, since there is no flow in the normal business model that employs such a connection. If the compliance data indicates such a connection, it indicates a potential data breach. As a further example, the compliance data indicates a count of connections between nodes. Accordingly, the rules may indicate how to identify whether they should be there or not. A security policy might include a rule to check that all client connections from a call center to a credit card authorization system use a secure protocol. An unsecure connection may indicate a vulnerable link, fraud, or unauthorized employee usage.

FIG. 1 is a context diagram of a managed information network environment 100 suitable for use with the present invention. Referring to FIG. 1, a network compliance manager (compliance manager) 110 is responsive to rule violation occurrences 120 indicative of network health, and operable to generate external notifications 130 concerning compliance with the rules. Each of the rules is part of a policy promoted by a particular corporate, regulatory, or industry for promoting beneficial practices. A network 150 includes a plurality of interconnected nodes 152, or hosts, collectively operable to establish connections, execute applications, and perform services on behalf of other nodes 152 in the network. A repository 140 includes compliance data 142 having information concerning rule violation occurrences 120, and is populated by a gathering daemon 113 that passively probes or scans the network 150 for hosts (nodes running an application), services provided by applications, and connections for communication between applications. The rules, or lack of compliance thereof, result in generation of an external notification 130 of non-compliance, depending on the severity of the violation occurrences 120, discussed in the description and figures that follow. The notifications may take a variety of forms, such as an email 130-1, paper interface 130-2 (e.g.

trouble ticket), and others 130-3, such as so-called texting or instant messaging (IM) notifications. The compliance manager 110 executes on a server 112 coupled to a console 114 having a GUI 116 to which the compliance manager 110 is responsive for reports of rule compliance.

Figure 2:
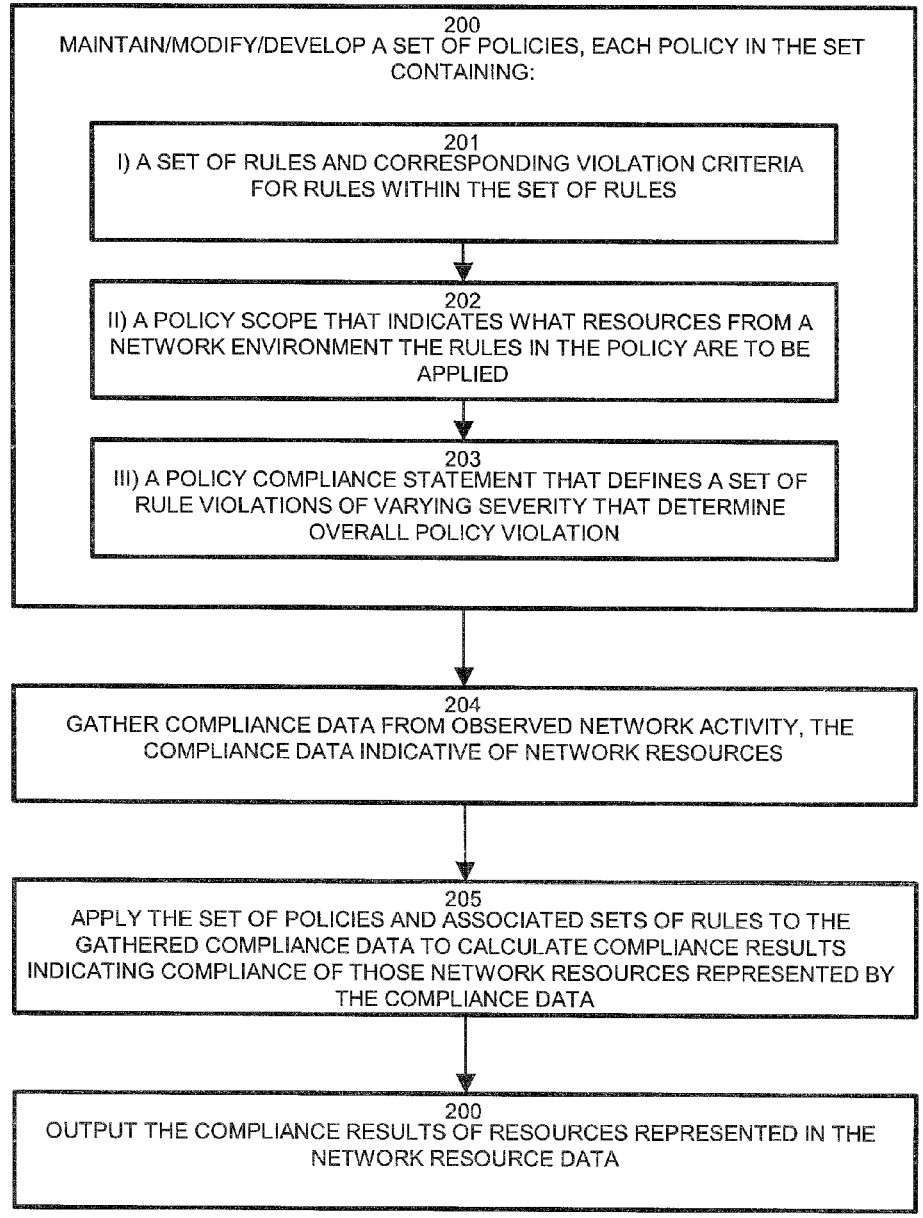
FIG. 2 is a flowchart of policy definition in the environment of FIG. 1.

FIG. 2 is a flowchart of policy definition in the environment of FIG. 1. Referring to FIGS. 1 and 2, at step 200, the method of policy-based testing of network resource compliance as defined herein includes maintaining a set of policies of network compliance. Each policy in the set contains i) a set of rules and corresponding violation criteria for rules within the set of rules, as shown at step 201, ii) a policy scope that indicates what resources from a network environment the rules in the policy are to be applied, as depicted at step 202, and iii) a policy compliance statement that defines a set of rule violations of varying severity that determine overall policy violation, as shown at step 203. Through data collection and analysis mechanisms discussed further below, the compliance manager 110 gathers or receives the compliance data 142 from observed network activity, in which the compliance data 142 is indicative of network resources, as depicted at step 204. The compliance manager 110 applies the set of policies and associated sets of rules to the gathered compliance data 142 to calculate compliance results indicating compliance of those network resources represented by the compliance data, as shown at step 205, and outputting the compliance results of resources represented in the network resource data to a GUI 116 or via external notifications 130 or other messaging mechanisms.

Figure 3:
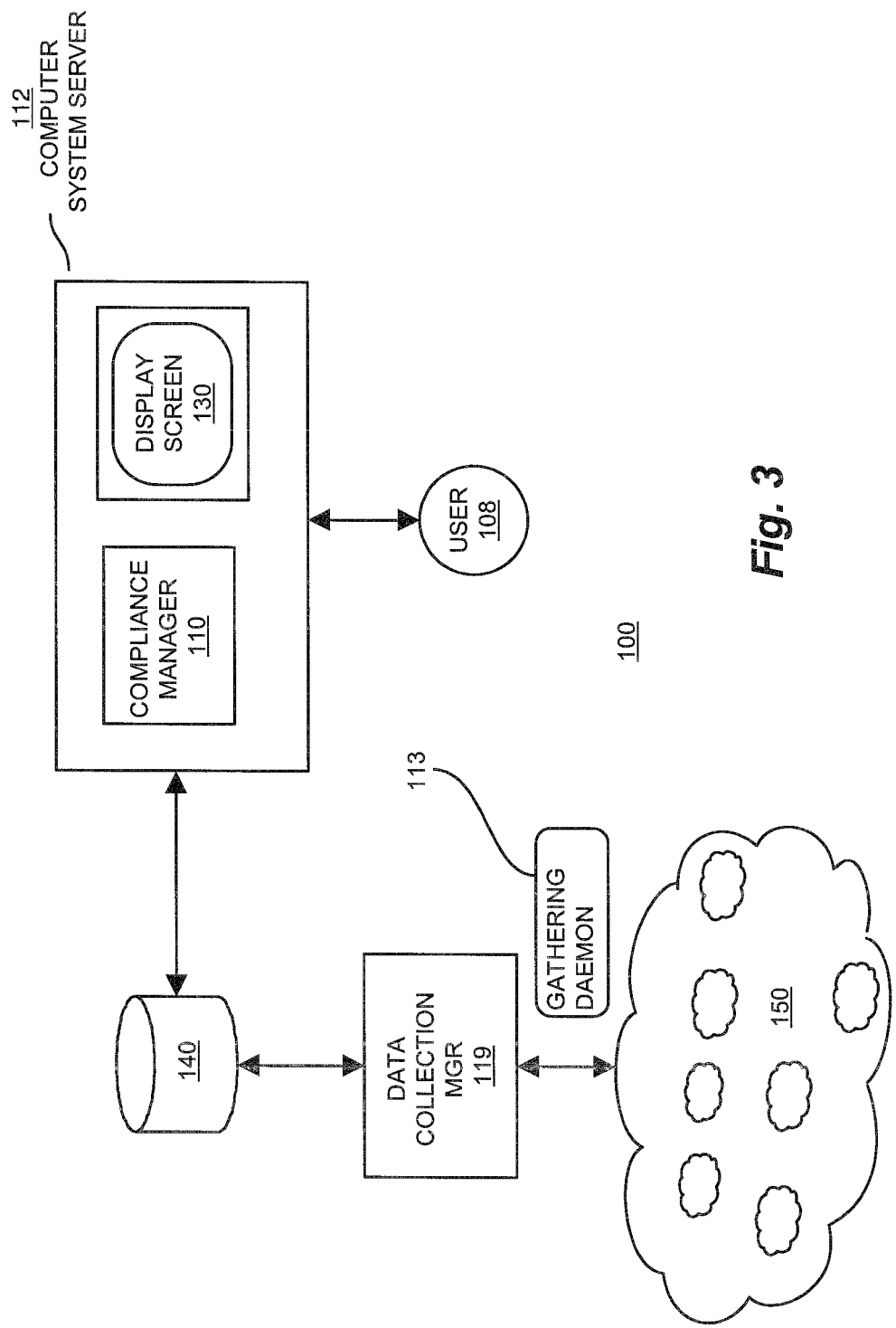
FIG. 3 is an example configuration of a network environment operable for policy definition as in FIG. 2.

FIG. 3 is an example diagram illustrating collection of resource data and use of a compliance manager 110 and related functions according to embodiments herein. As shown, the communication environment 100 includes network 150, data collection manager 119, repository 140, computer system 110, display screen 116, compliance manager 110, and user 108.

As its name suggests, data collection manager 119 collects data (e.g., network resource information) from resources, services, processes, switch applications, etc. operating and/or present in network 150. Network 150 can include one or more networks of sub-resources having data collected by data collection manager 119. Data collection manager 119 can be configured to collect information in many different ways. For example, the data collection manager 119 can initiate direct queries to resources in respective network 150. Queries can include requests for configuration data associated with a queried resource. Responses to queries can include data such as version information associated with a particular application, vendor information, etc. associated with a queried resource. Data collection manager 119 then stores the received information in the repository 140 for application of compliance policies and corresponding rules.

Note that the data collection manager 119 can also retrieve information from resources based on indirect queries. For example, the data collection manager 119 can communicate with agents that collect resource data on behalf of the data collection manager 119.

In addition to direct and indirect queries, the data collection manager 119 can also monitor connections or connectivity by monitoring message information transmitted between the network resources present in network 150. For example, the data collection manager 119 can be configured to analyze the message data transmitted in network 150 and store appropriate information about different monitored connections in the repository 140.

Based on analysis of the message data, the data collection manager 119 can identify different types of information such as a protocol used to support communicates between applications, whether two or more applications communicate via encrypting data, types of information exchanged between the two or more applications, which applications communicate with each other, etc. The compliance manager 110 can apply rules (121, FIG. 6 below) to identify whether certain applications are allowed to communicate with each other or whether the applications communicate with each other using a proper protocol as specified by a rule.

In a particular configuration, the data collection manager 119 analyzes the collected data and stores the information as objects in a repository 140 (e.g., a database or other storage device). Each object in the repository includes information associated with a respective resource in the network 150. Storage of the collected information (and/or other derived information) can include classifying the information in one of three classes such as whether the resource information is associated with a host resource, a connection, or service in network 150. This classification is only example and can be extended to any number of classes, sub-classes, etc.

As an example of an embodiments herein, the network 150 can include resources such as clients, servers, switches, storage devices, host resource, connections supporting communications between computer systems, services, etc. in network 150. A network resource such as a client resource (e.g., a computer system) can be classified as a host resource. The computer system server 112 can support a number of applications such as an operating systems, text editor applications, e-mail applications, etc. Upon collection of data associated with the sub-resources (e.g., operating system, text editors applications, etc.), the data collection manager stores 120 stores the information in objects. Each object (e.g., representing a resource or sub-resource) in the repository 140 includes information about the resource such as software version information, vendor information, computer system on which the application operates, etc.

In one embodiment, the data collection manager 119 stores the information in the repository 140 as a hierarchical tree of information. Pointers associated with the objects indicate how the objects are related to each other.

Via retrieval of resource data in repository 140, the compliance manager 110 applies policies and corresponding rules to verify compliancy. Retrieval can be achieved via queries (e.g., SQL queries) applied to repository 140.

As will be discussed later in this specification, via a graphical user interface on display screen 116, the compliance manager 110 enables a respective user to create policies and corresponding rules to verify compliance with respect to resource configurations (e.g., based on information stored in repository 140 from the direct and indirect queries) as well verify compliance with respect to two or more resources that communicate with each other over network 150 (e.g., based on message information transmitted between resources).

Accordingly, a particular configuration disclosed herein includes applying a rule to a repository of message data (passively or actively) collected from multiple application resources communicating with each other over the network 150. Based on a comparison of compliance conditions (i.e. test of the desired state portion of a rule) to portions of the repository of message data as specified by the rule scope definition, the compliance manager 110 identifies or determines compliancy with respect to the communicating application resources.

As mentioned above, the resource data can include configuration information associated with the resources in network 150. Based on application of rules to the repository of data, the compliance manager 110 is able to identify compliancy with respect to corresponding configurations of the application resources.

Figure 4:
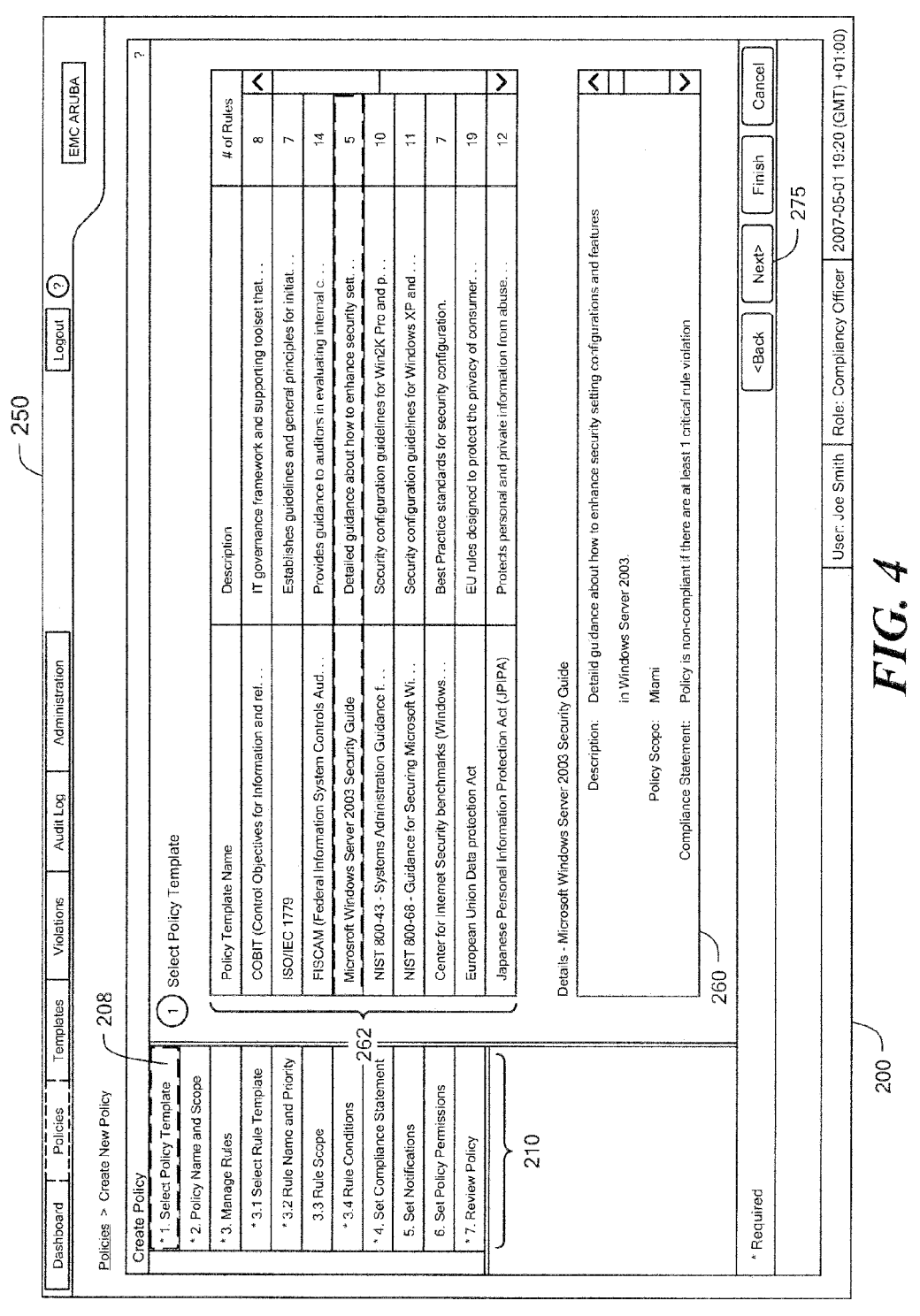

FIG. 4 is a screen display of selection of a policy from a template in the definition of FIG. 4. Shown in FIG. 4 is an example screenshot 200 illustrating a graphical user interface 250 as generated by compliance manager 110 for display on display screen 116 according to embodiments herein. As shown, graphical user interface 250 enables management of compliance policies. Menu 210 of graphical user interface 250 enables a respective network administrator to create compliance policies and corresponding rules using a step-by-step process. For example, to create a new compliance policy, the user can select entry 208 from multiple policy templates in menu 210 that represent existing policies. The compliance manager 110 displays summary details associated with the selected compliance policy in viewing region 260. Upon selection of "next" symbol 275, the compliance manager 110 initiates display of the screenshot 300 as shown in FIG. 5.

Figure 5:
FIG. 5 is a screen display of selection of policy scope in the definition of FIG. 2.

FIG. 5 is a screen display 300 of selection of policy scope in the definition of FIG. 4. Shown in FIG. 5 is an example screenshot 300 illustrating a graphical user interface 250 enabling a user to name a compliance policy and select a scope for applying the compliance policy according to embodiments herein. For example, screenshot 300 illustrates details associated with the selected compliance policy template as in screenshot 200. To cerate a new compliance policy, the user 108 renames the compliance policy via input with respect to display field 352. The user 108 is able to provide a description of the compliance policy via input with respect to display field 354. The user identifies a scope of resources in network 150 to which the compliance policy applies via input with respect to display fields 356. As shown, the compliance policy scope can be defined as a group of resources in a geographic region, a range of network addresses, etc.

Based on the policy scope selection, the compliance manager 110 initiates display of compliance policy coverage information in display field 358 to notify the user of different resources (e.g., hosts, services, connections, etc.) to which the compliance policy applies, prior to completing definition of the policy. Upon selection of "next" symbol 375, the compliance manager 110 initiates display of a rule specification, as disclosed in the copending application cited above.

Figure 6:
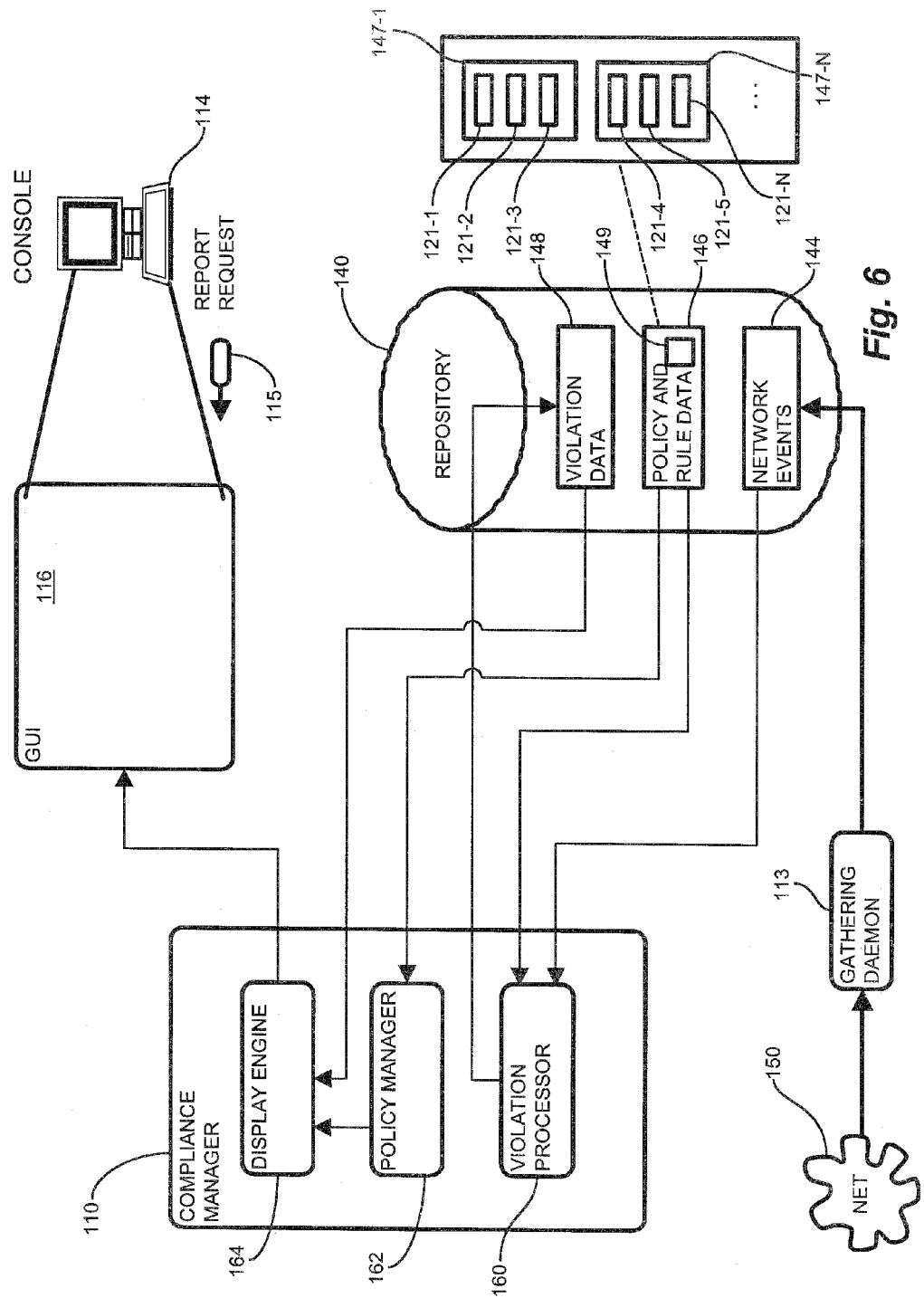
FIG. 6 is a block diagram of policy definition in the environment of FIG. 3.

FIG. 6 is a block diagram of policy definition in the network environment 100 operable according to the flowchart of FIG. 2. Referring to FIGS. 1, 3 and 6, the compliance manager 110 includes a violation processor 160, a policy manager 162, and a display engine 164. The compliance data 142 in the repository 140 includes network events 144, policy and rule data 146, and violation data 148. The policy and rule data 146 includes applicable policies 147-1 . . . 147-N (147 generally), each including a set of rules 121-1 . . . 121-N (121 generally). Development and management of the policies 147 and rules 121 is discussed further in the copending applications cited above. In operation, the violation processor 160 receives network events 144 and compares them to rules 121 in the policy and rule data 146 for computing rule violations 120. The network events 144 remain current via the gathering daemon 113 coupled to the network. The repository stores the rule violations 120 as violation data 148 for access by the display engine 164. The display engine 164 drives the GUI 116 screens for policy definition, discussed further below, and is also responsive to report requests 115 for compliance reports. The policy manager 162 identifies, for requested policies, which rules 121 belong to particular policies 147, the violation occurrences 120 corresponding to those rules, and overall compliance for each of the policies 147.

Figure 7:
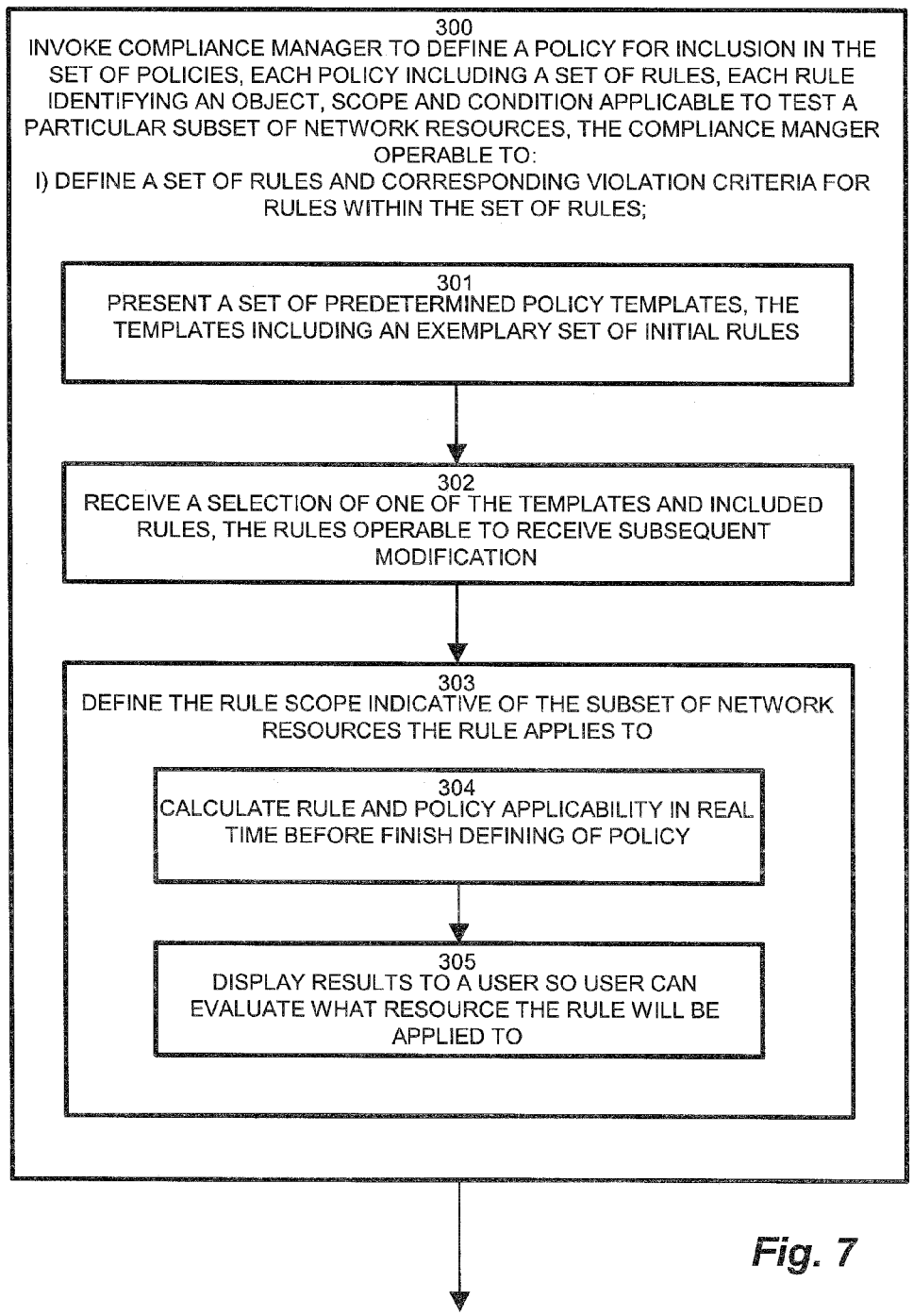
FIGS. 7-9 are a flowchart of screen view processing in the configuration of FIG. 3.
Figure 8:
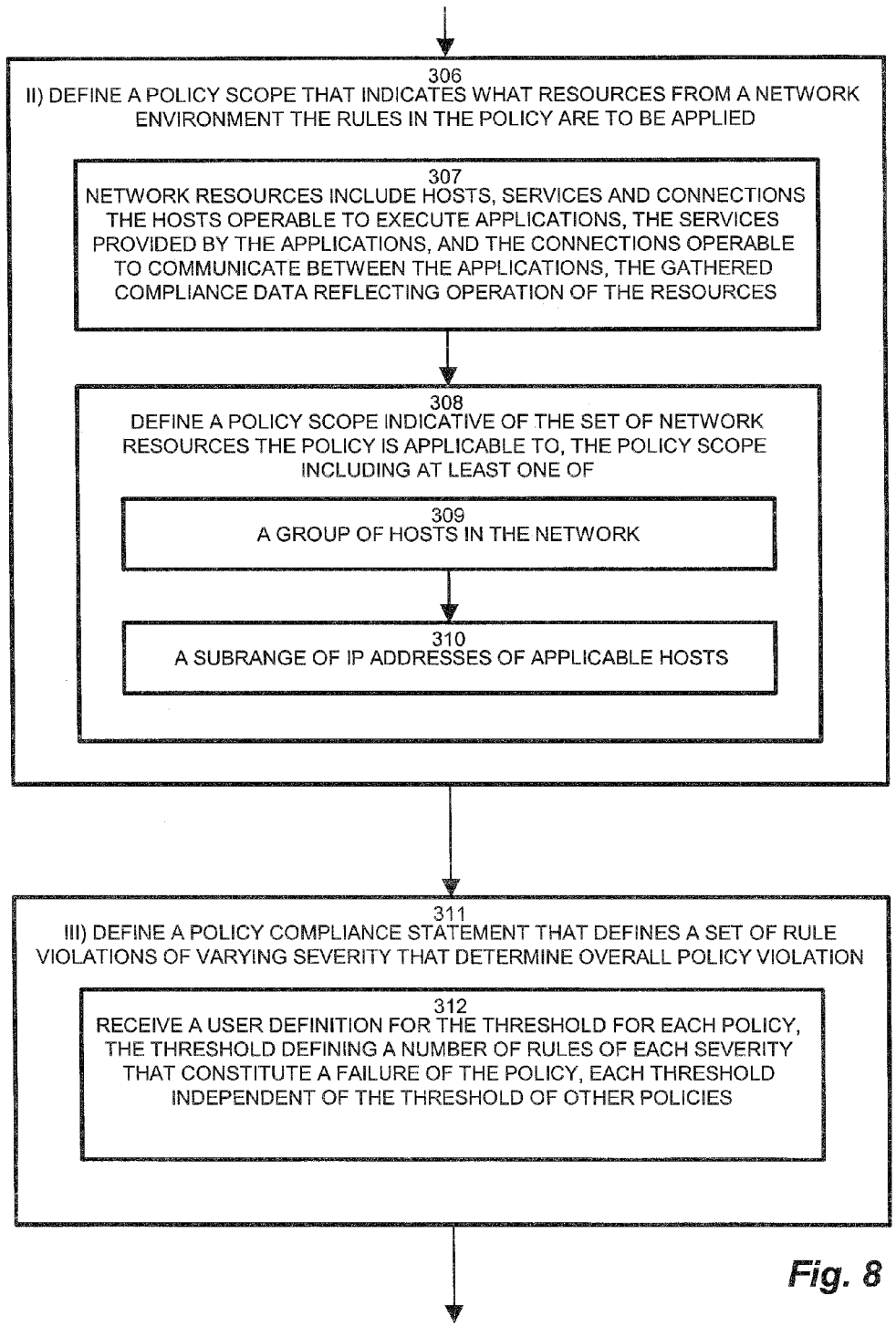
Figure 9:
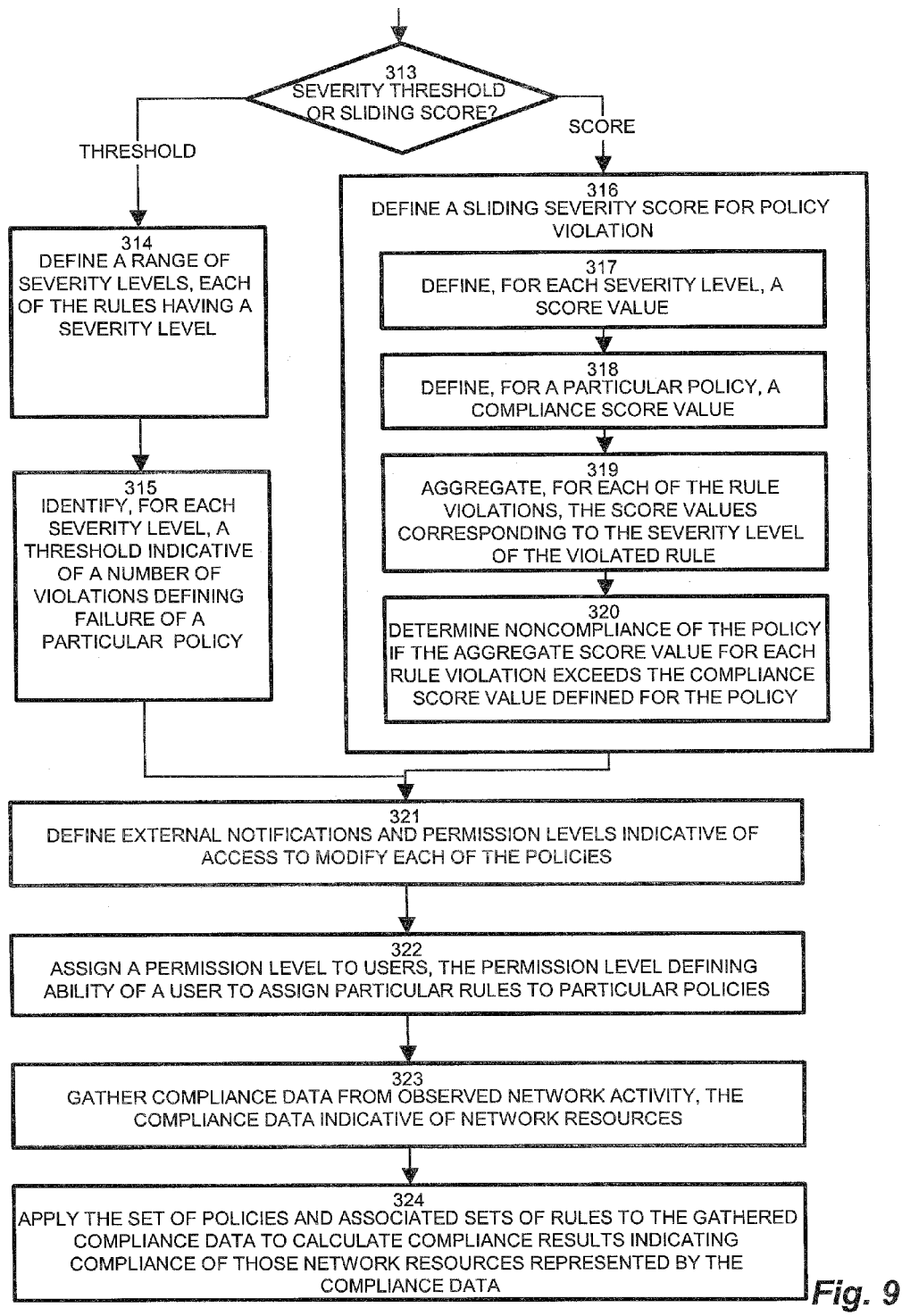

FIGS. 7-9 are a flowchart of policy definition screen processing in the configuration of FIG. 3, and according to the block diagram of FIG. 6. Referring to FIGS. 3 and 6-9, the method of policy-based testing of network resource compliance as disclosed herein includes maintaining a set of policies 146, each 147 policy in the set containing a set of rules 121 and corresponding violation criteria for rules within the set of rules, as depicted at step 300. Defining the policy further includes presenting a set of predetermined policy templates 149 in a template window 262, the templates including an exemplary set of initial rules, as shown at step 301. As depicted above in FIG. 4, the policy templates 149 are predetermined sets of rules based on governmental regulations, corporate guidelines, and/or industry best practices. The selected template is then adapted to be customized to suit the needs of the particular network, as now discussed further. The display engine 164 receives a selection of one of the templates 149 and included rules 121, such that the rules 121 are operable to receive subsequent modification, as disclosed at step 302.

The selected template defines a policy 147 for inclusion in the set of policies 146, each policy including a set of rules, each rule identifying an object, scope and desired state applicable to test a particular subset of network resources. As discussed further in the copending application cited above, each of the rules in the policy has a rule scope, such that the rule scope is indicative of a subset of network resources that the rule is applicable to, as shown at step 303. During rule definition, the compliance manager 110 calculates rule applicability in real time before finish defining of policy, as shown at step 304, and the display engine 164 displays results to a user 108 so that the user can evaluate what resource the rule will be applied to, as shown at step 305.

Prior to customizing the rules in this manner, however, the compliance manger 110 receives the policy scope that indicates what resources from a network environment the rules 121 in the policy 147 are to be applied, as shown at step 306. The policy scope identifies the network resources that the policy applies to, in which the network resources include hosts, services and connections the hosts operable to execute applications, the services provided by the applications, and the connections operable to communicate between the applications such that the gathered compliance data reflects operation of the resources, as depicted at step 307.

An example group defines a set of hosts, or nodes 152, and hence is identifiable by the network location of the nodes. As shown in FIG. 5, in the scope window 356, the user defines a policy scope indicative of the set of network resources the policy is applicable to, as shown in step 308. The selected policy scope includes at least one of a group of hosts in the network, as shown at step 309, or a subrange of IP addresses of applicable hosts, as depicted at step 310. When the policy 147 is applied, the violation processor 160 applies each of the rules 121 in the policy 147 to each of the hosts 152 (resources) defined in the policy scope.

Figure 10:
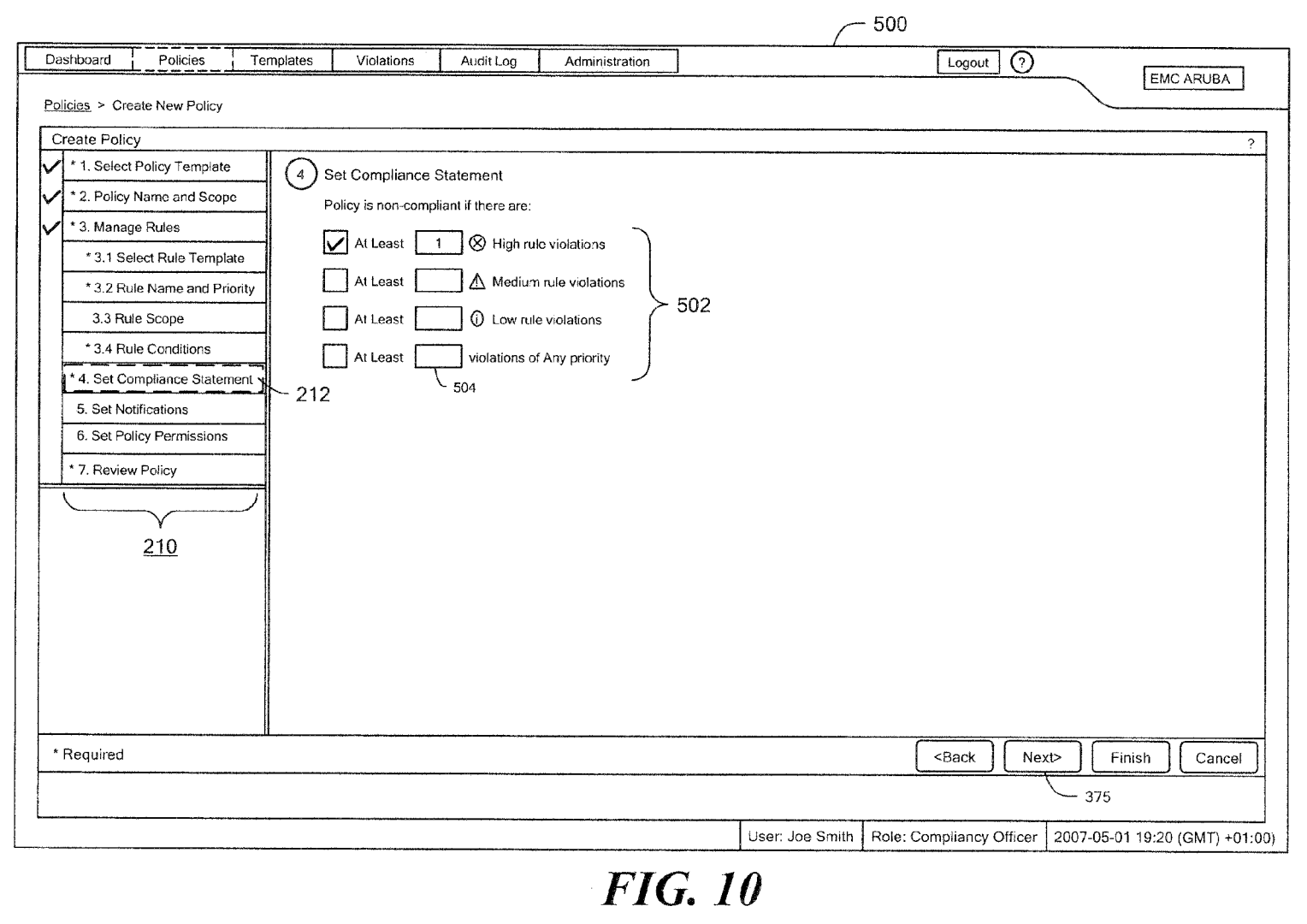

Policy definition also includes a policy compliance statement that defines a set of rule violations of varying severity that determine overall policy violation, as shown at step 311. As shown in FIG. 10 below, from the menu 210 selection 212, compliance manager 110 receives a user definition for the threshold for each policy 147, such that the threshold defines a number of rules 121 of each severity that constitute a failure of the policy 147, in which each threshold is independent of the threshold of other policies (i.e. has its own threshold values or scores). Conventional policy management employs a black and white approach in which a single failure of arbitrary magnitude can render noncompliance with respect to the entire policy. The compliance statement definition disclosed herein provides definition of individual policy criteria specifying policy noncompliance. Noncompliance can be defined as a threshold number of noncompliant instances of a particular severity, or according to a sliding scale that weighs the severity of individual rule violations. Accordingly, setting the compliance statement includes specifying, for each policy, a severity based threshold or a sliding score, as depicted at step 313. Following the check at step 313, in the case of severity thresholds, the compliance manager 110 defines or establishes a range of severity levels, each of the rules having a severity level, as disclosed at step 314, and shown in severity tolerances 502 in FIG. 10. The user then identifies, for each severity level, a threshold value 504 indicative of a number of violations defining failure of a particular policy 147, as depicted at step 315. Therefore, for each of the severity levels (high, medium and low in the example configuration, although any suitable number of tiers may be used), a user enters a compliance threshold value 504. The compliance threshold value specifies the number of violations (non-compliances) of each severity level that will be tolerated until the policy fails (is found non-compliant). Typically, fewer violations of a more severe threshold are to be tolerated, while more of a minor threshold would be required to trigger entire policy failure. Since the compliance threshold values of each severity level are independently set for each policy 147, each policy is tunable to be as conservative or as accommodating as the network situation dictates.

Alternatively, from step 313, a user may select a sliding severity score for policy violation, as depicted at step 316. The compliance manager receives, for each severity level, a score value, as shown at step 317, and defines, for a particular policy, a compliance score value, as depicted at step 318. The score value for the severity of a violation are added, and compliance is satisfied if the failure score is less than the compliance score value for the policy. Thus, the violation processor 160 aggregates, for each of the rule violations 120, the score values corresponding to the severity level of the violated rule 121, as disclosed at step 319, and determines noncompliance of the policy 147 if the aggregate score value for each rule violation exceeds the compliance score value defined for the policy 147, as depicted at step 320.

Figure 12:
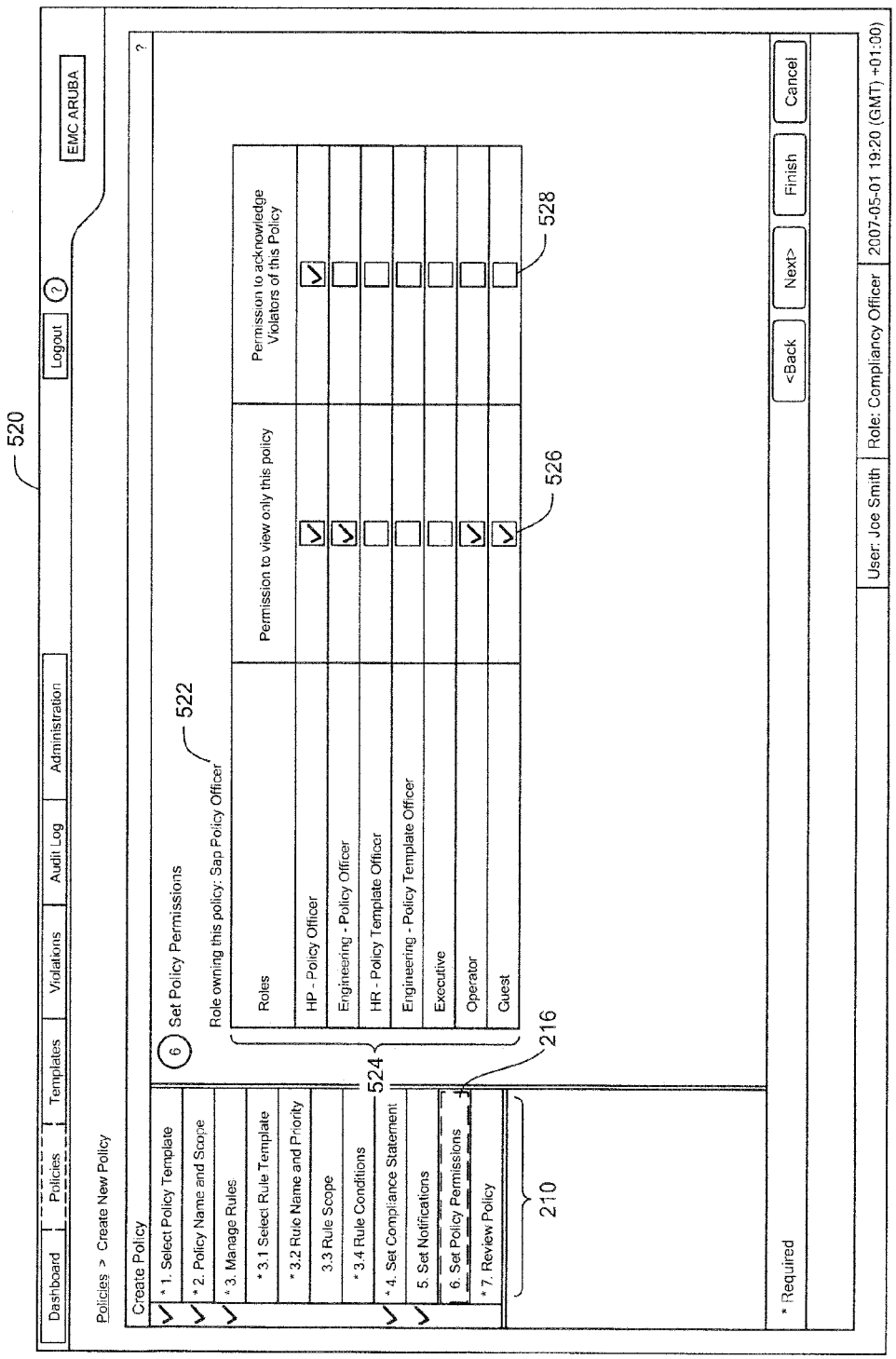
FIG. 12 is a screen display of selection of policy permissions in the definition of FIG. 6.

Continuing from the policy and rule menu 210, once the policy rules are defined, according to the mechanism outlined in the copending patent application referenced above, the compliance manager 110 sets external notifications 130, shown in the notifications screen display 510, discussed below, and defines permission levels 216 through owner roles indicative of access to modify each of the policies, as shown at step 321. Permission to access a policy is set by sharing a policy with other owner roles who are also authorized to access the policy. Each policy has an owner role. Only users from the same owner role can share that policy with other users that are from other roles. Referring also to FIG. 12, for the selected policy 522, the user defines a set of authorized roles 524 paralleling users of the compliance manager 110. For each user role 524, the compliance manager 110 receives a selection to assigning an owner role indicative of a permission level to users, such that the owner role defines the ability of a user to assign particular rules to particular policies, as depicted at step 322, by selecting an option to view 526 and to modify 528 the policy that are selectable in checkoff buttons.

Following definition of the policies 147 and rules 121 therein, the compliance manager 110 pursues the ongoing task of gathering the compliance data 142 from observed network activity such that the compliance data 142 is indicative of network resources (network events 144), as disclosed at step 323. The violation processor 180 applies the set of policies 147-N and associated sets of rules 121-N to the gathered compliance data 142 to calculate compliance results in the form of violation data 148 indicating compliance of those network resources represented by the compliance data, 142, depicted at step 324. Responsive to report requests 115 and requested external notifications 130, the display manager outputs the compliance results of resources represented in the network resource data 144, as discussed in the copending patent application cited above.

The remaining screen displays for policy definition referenced above are now discussed in further detail. FIG. 10 is a screen display 500 of selection of policy compliance thresholds in the definition of FIG. 6. In FIG. 10, the user selects a threshold number 504 of violations 120 for each of the severity levels 502 defined for the policy 147, typically high, medium and low. For each of the severity levels 502, the user specifies a threshold (number) 504 of violations 120, which, if exceeded, will cause the policy to be deemed non-compliant. A collective "catch all" allows specification of a number of violations of any level triggering non-compliance, and a user is required to specify at least one severity threshold (such as a maximum number of high severity occurrences). Also, as discussed above, as an alternative configuration, a sliding score option may also be provided that allows a point value for each severity label, and an aggregate point limit defining overall policy non-compliance.

Figure 11:
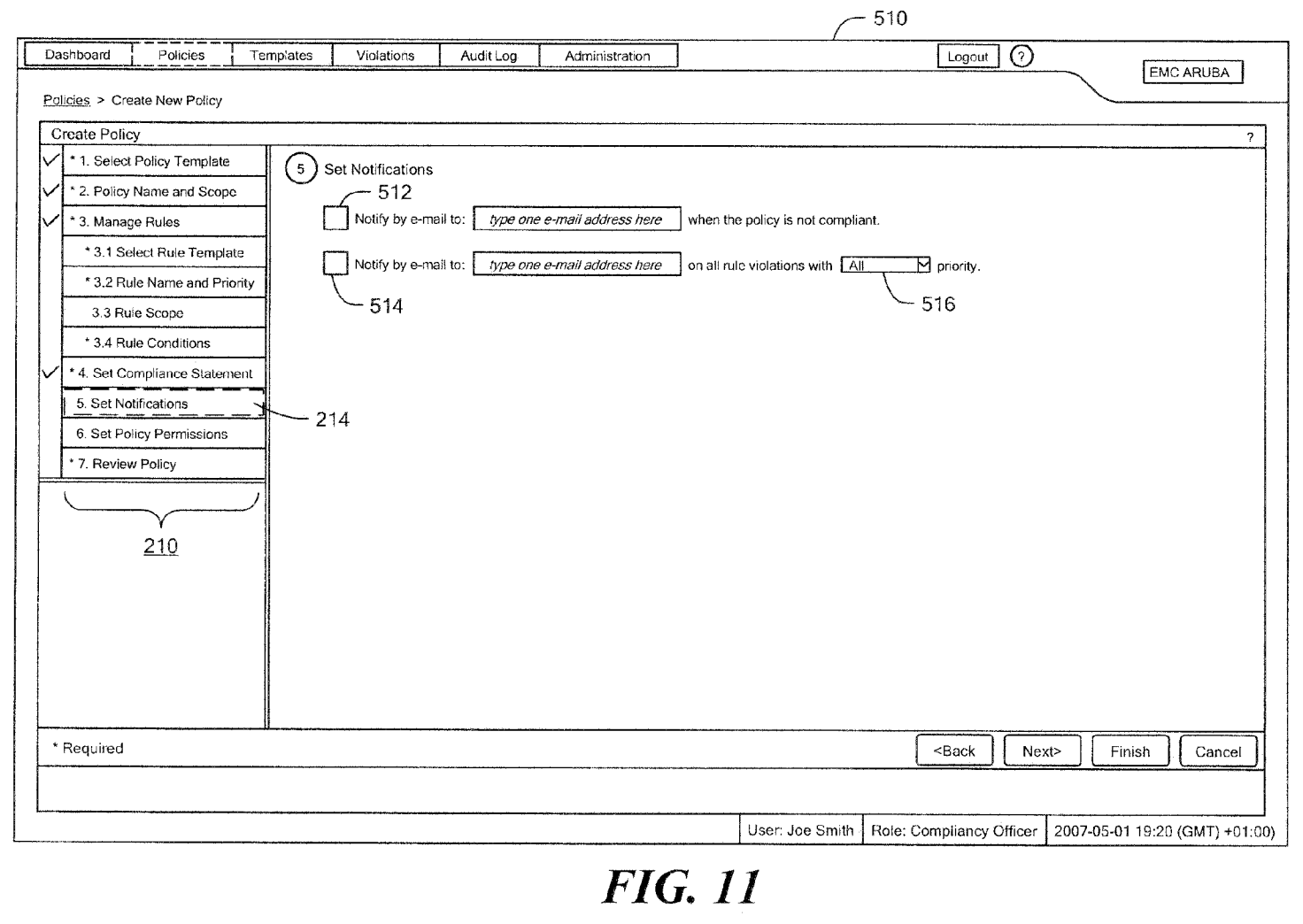

FIG. 11 is a screen display 510 of selection of compliance notifications 130 in the definition of FIG. 6. In addition to direct report requests 115 from the GUI 116, automated notifications are selectable for alerting system managers and others of compliance violations. A blanket selection 512 of a destination email for policy noncompliance allows email notification to a responsible party for overall policy noncompliance. A more refined selection 514 of non-compliant rules allows an email destination for notification of violations of a threshold number 516 of a particular severity, similar to the non-compliance thresholds 504 of FIG. 10.

FIG. 12 is a screen display 520 of selection of policy permissions in the definition of FIG. 6. From menu 210 selection 216, the user selects authorized roles 524, along with view permissions 526 and modify permissions 528, as outlined above. The illustrated checkoff boxes 526, 528 privilege scheme may be augmented with more granular of hierarchical authorization and/or authentication mechanism in alternative configurations, however.

Figure 13:
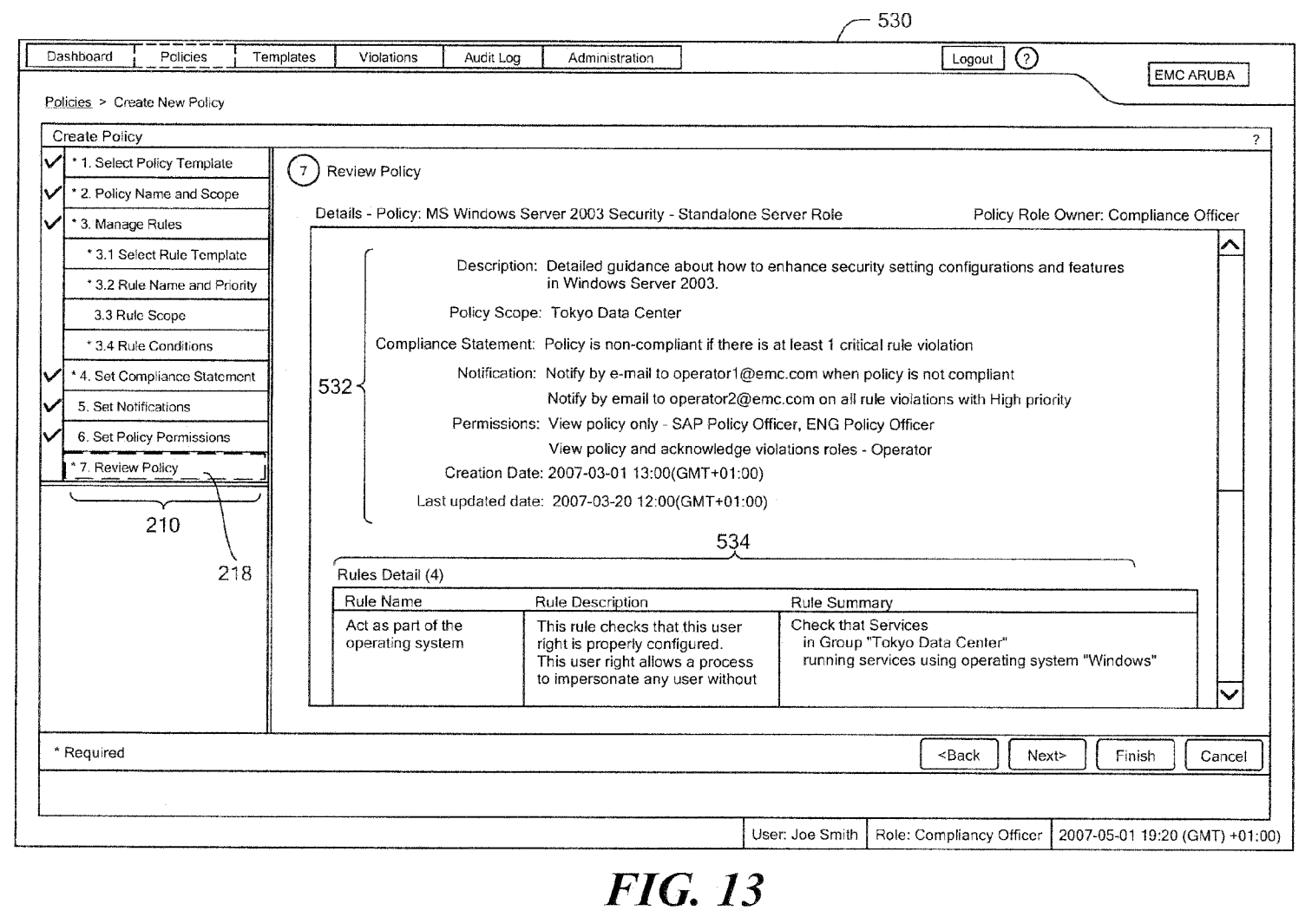

FIG. 13 is a screen display 530 of policy review in the definition of FIG. 6. From menu 210 selection 218, a policy review window 530 recapitulates the selected attributes 532 of the policy just defined, as well as the rules 534 included in that policy prior to storing and deploying the policy.

Those skilled in the art should readily appreciate that the programs and methods for managing network policies as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for managing network policies has been particularly shown and described with references to embodiments thereof, it will be understood by those skilled in the art that various changes in form and details may be made therein without departing from the scope of the invention encompassed by the appended claims.

What is claimed is:

1. A method of policy-based testing of network resource compliance at a node in a network, the method comprising:
    maintaining a set of network resource compliance policies, each network resource compliance policy in the set including:
        i) a set of network resource compliance rules and corresponding network resource compliance violation criteria for each of the network resource compliance rules within the set of network resource compliance rules;
        ii) a network resource compliance policy scope that indicates what resources from a network environment the network resource compliance rules in the network resource compliance policy are to be applied;
        iii) a network resource compliance policy compliance statement that defines a set of network resource compliance rule violations of varying severity that determine overall network resource compliance policy violation;
    defining a range of network resource compliance violation severity levels, each of the network resource compliance rules having a network resource compliance violation severity level selected from the range of network resource compliance violation severity levels;
    defining a sliding severity score for policy violation, comprising:
    defining, for each severity level, a score value;
    defining, for a particular policy, a compliance score value;
    aggregating, for each of the rule violations, the score values corresponding to the severity level of the violated rule; and
    determining noncompliance of the policy if the aggregate score value for each rule violation exceeds the compliance score value defined for the policy;
    identifying, for each network resource compliance violation severity level, a threshold indicative of a number of violations of network resource compliance rules in the set of network resource compliance rules included in the network resource compliance policy;
    gathering network resource compliance data from observed network activity, the network resource compliance data indicative of network resources;
    applying the set of network resource compliance policies and associated sets of network resource compliance rules to the gathered network resource compliance data to calculate network resource compliance results indicating compliance of those network resources represented by the network resource compliance data; and
    outputting the network resource compliance results of network resources represented in the network resource compliance data from the node in the network.

2. The method of claim 1 further comprising defining a policy for inclusion in the set of policies, each policy including a set of rules, each rule identifying an object, scope and condition applicable to test a particular subset of network resources.

3. The method of claim 2 wherein the network resources include hosts, services and connections the hosts configured to execute applications, the services provided by the applications, and the connections configured to communicate between the applications, the gathered compliance data reflecting operation of the resources.

4. The method of claim 1 further comprising receiving a user definition for the threshold for each policy, the threshold defining a number of rules of each severity that constitute a failure of the policy, each threshold independent of the threshold of other policies.

5. The method of claim 3 further comprising defining a policy scope indicative of a set of network resources the policy is applicable to, the policy scope including at least one of:
    group of hosts in the network; or
    a subrange of IP addresses of applicable hosts.

6. The method of claim 5 wherein each of the rules in the policy has a rule scope, the rule scope indicative of a subset of network resources that the rule is applicable to, further comprising:
    defining the rule scope indicative of the subset of network resources the rule applies to;
    calculating rule applicability in real time before completion of policy definition; and
    displaying results to a user so the user can evaluate what resources the rule will be applied to.

7. The method of claim 6 further comprising:
    defining permission via owner roles indicative of access to modify each of the policies;
    assigning an owner role to users, the owner role defining ability of a user to assign particular rules to particular policies; and
    selectively assigning the same owner role to other users for modifying an owned policy.

8. The method of claim 2 wherein defining the policy further includes:
    presenting a set of predetermined policy templates, the templates including an exemplary set of initial rules; and
    receiving a selection of one of the templates and included rules, the rules operable to receive subsequent modification.

9. The method of claim 4 further comprising assigning external notifications of non-compliance by:
    selecting a policy for which notifications are to be sent;
    identifying a destination recipient for notification of a policy non-compliance; and
    specifying at least one severity threshold notification recipient, wherein a severity threshold notification is sent to the recipient if a threshold number of specified severity violations occurs.

10. The method of claim 1 wherein the set of network resource compliance rule violations of varying severity defined by the network resource compliance policy compliance statement comprise a combination of thresholds of respective selectable network resource compliance violation severity levels.

11. The method of claim 10 wherein the network resource compliance policy compliance statement further comprises an additional threshold defining network resource compliance rule violations irrespective of network resource compliance violation severity level.

12. A network compliance server for policy-based testing of network resource compliance comprising:

a policy manager configured to:
maintain a set of network resource compliance policies, each network resource compliance policy in the set including:
i) a set of network resource compliance rules and corresponding network resource compliance violation criteria for each of the network resource compliance rules within the set of network resource compliance rules;
ii) a network resource compliance policy scope that indicates what resources from a network environment the network resource compliance rules in the network resource compliance policy are to be applied;
iii) a network resource compliance policy compliance statement that defines a set of network resource compliance rule violations of varying severity that determine overall network resource compliance policy violation;
define a range of network resource compliance violation severity levels, each of the network resource compliance rules having a network resource compliance violation severity level selected from the range of network resource compliance violation severity levels;
define a sliding severity score for policy violation;
define, for each severity level, a score value;
define, for a particular policy, a compliance score value;
aggregate, for each of the rule violations, the score values corresponding to the severity level of the violated rule;
determine noncompliance of the policy if the aggregate score value for each rule violation exceeds the compliance score value defined for the policy;
identify, for each network resource compliance violation severity level, a threshold indicative of a number of violations of network resource compliance rules in the set of network resource compliance rules included in the network resource compliance policy; and
receive a user definition for the threshold for each network resource compliance policy, the threshold defining a number of network resource compliance rules of each network resource compliance violation severity level that constitute a failure of the network resource compliance policy, each threshold independent of the threshold of other policies;
a repository storage device configured to receive gathered network resource compliance data from observed network activity, the network resource compliance data indicative of network resources;
a network resource compliance violation processor configured to apply the set of network resource compliance policies and associated sets of network resource compliance rules to the gathered network resource compliance data to calculate network resource compliance results indicating compliance of those network resources represented by the network resource compliance data; and
a display engine configured to report the network resource compliance results of network resources represented in the network resource compliance data.

13. The server of claim 12 wherein the policy manager is further configured to define a policy for inclusion in the set of policies, each policy including a set of rules, each rule identifying an object, scope and condition applicable to test a particular subset of network resources.

14. The server of claim 13 wherein the network resources include hosts, services and connections, the hosts configured to execute applications, the services provided by the applications, and the connections configured to communicate between the applications, the gathered compliance data reflecting operation of the resources.

15. The server of claim 14 wherein the policy manager is further configured to define a policy scope indicative of a set of network resources the policy is applicable to, the policy scope including at least one of:
a group of hosts in the network; or
a subrange of IP addresses of applicable hosts.

16. The server of claim 12 further comprising a compliance manager configured to define a scope, the compliance manager further configured to:
present a set of predetermined policy templates, the templates including an exemplary set of initial rules;
receive a selection of one of the templates and included rules, the rules operable to receive subsequent modification; each of the rules in the policy having a rule scope, the rule scope indicative of a subset of network resources the rule applies to, the policy manager configured to calculate rule applicability in real time before completion of policy definition, and the display engine configured to display results to a user so the user can evaluate the resources the rule will be applied to.

17. The server of claim 16 wherein the compliance manager is configured to define user permissions and notification by:
defining permission via owner roles indicative of access to modify each of the policies; and
assigning an owner role to particular users, the owner role defining ability of a user to assign particular rules to particular policies, and further assigning external notifications of non-compliance by:
selecting a policy for which notifications are to be sent;
identifying a destination recipient for notification of a policy non-compliance; and
specifying at least one severity threshold notification recipient, wherein a severity threshold notification is sent to the recipient if a threshold number of the specified severity violations occurs.

18. A computer program product having a non-transitory computer readable storage medium storing computer program logic embodied in computer program code encoded as a set of processor based instructions thereon for policy-based testing of network resource compliance comprising:
computer program code for maintaining a set of network resource compliance policies, each network resource compliance policy in the set including:
i) a set of network resource compliance rules and corresponding network resource compliance violation criteria for each of the network resource compliance rules within the set of network resource compliance rules;
ii) a network resource compliance policy scope that indicates what resources from a network environment the network resource compliance rules in the network resource compliance policy are to be applied;
iii) a network resource compliance policy compliance statement that defines a set of network resource compliance rule violations of varying severity that determine overall network resource compliance policy violation;
computer program code for defining a range of network resource compliance violation severity levels, each of the network resource compliance rules having a network resource compliance violation severity level selected from the range of network resource compliance violation severity levels;
computer program code for defining a sliding severity score for policy violation, comprising:
computer program code for defining, for each severity level, a score value;

computer program code for defining, for a particular policy, a compliance score value;

computer program code for aggregating, for each of the rule violations, the score values corresponding to the severity level of the violated rule; and computer program code for determining noncompliance of the policy if the aggregate score value for each rule violation exceeds the compliance score value defined for the policy;

computer program code for identifying, for each network resource compliance violation severity level, a threshold indicative of a number of violations of network resource compliance rules in the set of network resource compliance rules included in the network resource compliance policy;

computer program code for gathering network resource compliance data from observed network activity, the network resource compliance data indicative of network resources, the network resources including hosts, services and connections, the hosts configured to execute applications, the services provided by the applications, and the connections configured to communicate between the applications, the gathered network resource compliance data reflecting operation of the resources;

computer program code for applying the set of network resource compliance policies and associated sets of network resource compliance rules to the gathered network resource compliance data to calculate network resource compliance results indicating compliance of those network resources represented by the network resource compliance data; and computer program code for outputting the network resource compliance results of network resources represented in the network resource compliance data.

* * * * *